United States Patent
Gavrilov et al.

(10) Patent No.: US 11,003,522 B2
(45) Date of Patent: May 11, 2021

(54) APPARATUS, METHOD, SYSTEM FOR DETECTING A DEGRADED GRID CONTROLLER

(71) Applicant: International Business Machines Corporation, Armonk, NY (US)

(72) Inventors: Constantine Gavrilov, Rishon le-Zion (IL); Osnat Shasha, Holon (IL); Ilya Tkachevsky, Ashdod (IL); Shlomit Neufeld, Efrat (IL)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 16/359,715

(22) Filed: Mar. 20, 2019

(65) Prior Publication Data

US 2020/0301771 A1   Sep. 24, 2020

(51) Int. Cl.
G06F 11/07   (2006.01)

(52) U.S. Cl.
CPC ........ G06F 11/079 (2013.01); G06F 11/0727 (2013.01); G06F 11/0751 (2013.01)

(58) Field of Classification Search
CPC . G06F 11/079; G06F 11/0751; G06F 11/0727
USPC .......................................................... 714/37
See application file for complete search history.

(56) References Cited

U.S. PATENT DOCUMENTS

| | | | |
|---|---|---|---|
| 8,488,446 B1* | 7/2013 | Brandwine | H04L 45/22 370/225 |
| 9,106,676 B1* | 8/2015 | Hucik | H04L 67/1008 |
| 9,501,363 B1 | 11/2016 | Ottavio | |
| 9,965,364 B2 | 5/2018 | Markus et al. | |
| 2018/0004590 A1 | 1/2018 | Johnson et al. | |
| 2018/0219722 A1 | 8/2018 | Venkataraman et al. | |

* cited by examiner

*Primary Examiner* — Yair Leibovich
(74) *Attorney, Agent, or Firm* — Kunzler Bean & Adamson (57) ABSTRACT

An apparatus for detecting a degraded grid controller includes a status module that collects for individual grid controllers in a grid array a status update comprising a keepalive status and a connectivity indicator and/or a pending transaction indicator between pairs of the individual grid controllers. The apparatus also includes a responsiveness module that determines a responsiveness indicator for a particular grid controller based on the keepalive status and the connectivity indicator and/or the pending transaction indicator of the particular grid controller. The apparatus further includes a configuration module that removes the particular grid controller of the individual grid controllers from use in the grid array in response to the responsiveness module determining that the responsiveness indicator of the particular grid controller indicates that the particular grid controller is degraded. A method and a system for detecting a degraded grid controller perform similar functions to those of the apparatus.

20 Claims, 7 Drawing Sheets

Connectivity Table
402

| | | \multicolumn{4}{c}{Grid Controllers} | | | | | | | | | | | |
|---|---|---|---|---|---|---|---|---|---|---|---|---|---|---|---|---|
| | | A | | | | B | | | | C | | | | D | | | |
| | | I | C | R | D | I | C | R | D | I | C | R | D | I | C | R | D | |
| A | I | | | | | 10 | | | | 10 | | | | 9 | | | | A has connectivity to |
| | C | | | | | | 10 | | | | 10 | | | | 10 | | | 2 |
| | R | | | | | | | 10 | | | | 10 | | | | 10 | | other grid controllers |
| | D | | | | | | | | 10 | | | | 10 | | | | 10 | (e.g., B,C but not D) |
| B | I | 10 | | | | | | | | 10 | | | | 10 | | | | B has connectivity to |
| | C | | 10 | | | | | | | | 10 | | | | 10 | | | 2 |
| | R | | | 10 | | | | | | | | 10 | | | | 0 | | other grid controllers |
| | D | | | | 10 | | | | | | | | 10 | | | | 10 | (e.g., A,C but not D) |
| C | I | 10 | | | | 10 | | | | | | | | 10 | | | | C has connectivity to |
| | C | | 10 | | | | 10 | | | | | | | | 10 | | | 3 |
| | R | | | 10 | | | | 10 | | | | | | | | 10 | | other grid controllers |
| | D | | | | 10 | | | | 10 | | | | | | | | 10 | (e.g., A,B,C) |
| D | I | 9 | | | | 10 | | | | 10 | | | | | | | | D has connectivity to |
| | C | | 10 | | | | 10 | | | | 10 | | | | | | | 1 |
| | R | | | 10 | | | | 0 | | | | 10 | | | | | | other grid controller |
| | D | | | | 10 | | | | 10 | | | | 10 | | | | | (e.g., C) |

FIG. 4

Pending Transactions Table
502

| | | Grid Controllers | | | | | | | | | | | | | | | Pending Transactions |
|---|---|---|---|---|---|---|---|---|---|---|---|---|---|---|---|---|---|
| | | A | | | | B | | | | C | | | | D | | | |
| | | I | C | R | D | I | C | R | D | I | C | R | D | I | C | R | D | |
| A | I | | | | | 5 | | | | 5 | | | | 26 | | | | A has 81 pending transactions |
| | C | | | | | | 5 | | | | 5 | | | | 5 | | | |
| | R | | | | | | | 5 | | | | 5 | | | | 5 | | |
| | D | | | | | | | | 5 | | | | 5 | | | | 5 | |
| B | I | 5 | | | | | | | | 5 | | | | 5 | | | | B has 77 pending transactions |
| | C | | 5 | | | | | | | | 5 | | | | 5 | | | |
| | R | | | 5 | | | | | | | | 5 | | | | 22 | | |
| | D | | | | 5 | | | | | | | | 5 | | | | | 5 |
| C | I | 5 | | | | 5 | | | | | | | | 5 | | | | C has 60 pending transactions |
| | C | | 5 | | | | 5 | | | | | | | | 5 | | | |
| | R | | | 5 | | | | 5 | | | | | | | | | 5 | |
| | D | | | | 5 | | | | 5 | | | | | | | | | 5 |
| D | I | 26 | | | | 5 | | | | 5 | | | | | | | | D has 98 pending transactions |
| | C | | 5 | | | | 5 | | | | 5 | | | | | | | |
| | R | | | 5 | | | 22 | | | | | 5 | | | | | | |
| | D | | | | 5 | | | | 5 | | | | 5 | | | | | |

APPARATUS, METHOD, SYSTEM FOR DETECTING A DEGRADED GRID CONTROLLER

FIELD

This invention relates to computing systems and more particularly relates to detecting a degraded grid controller.

BACKGROUND

Some computing and storage systems use a grid architecture where all grid controllers function as equal members of a grid array. A grid architecture helps to ensure that all components of the system have an active role in servicing host requests. Individual grid controllers perform important roles, which are implemented in software on the grid controllers by specific service processes. Individual grid controllers may be added to the grid array and if a particular grid controller fails, the grid array can redistribute the load to remaining grid controllers. Some grid controllers fail to respond at all, such as for example when the particular grid controller is powered down or taken offline. A particular grid controller that is online but has problems connecting and/or transacting with another grid controller may not be able to determine the source of the problem.

SUMMARY

An apparatus for detecting a degraded grid controller in a grid array is disclosed. A method and system also perform the functions of the apparatus. In one embodiment, the apparatus includes a status module that collects for individual grid controllers in a grid array a status update comprising a keepalive status and at least one of a connectivity indicator between pairs of the individual grid controllers and a pending transaction indicator between pairs of the individual grid controllers. The apparatus includes a responsiveness module that determines a responsiveness indicator for the individual grid controllers based on the keepalive status and the at least one of the connectivity indicator and the pending transaction indicator and a configuration module that removes a particular grid controller from use in the grid array in response to the responsiveness module determining that the responsiveness indicator of the particular grid controller indicates that the particular grid controller is degraded.

In certain embodiments, the status module sends a request for the status update to the individual grid controllers in response to determining that a transaction between the individual grid controllers is stuck. In some embodiments, the individual grid controllers send the status update to the status module according to a predetermined schedule. In various embodiments, the status module determines the connectivity indicator between pairs of the individual grid controllers based on a predetermined number of services involving the pairs of the individual grid controllers being connected. In at least one embodiment, the status module determines the connectivity indicator for the particular grid controller to be a total number of individual grid controllers to which the particular grid controller is connected.

In various embodiments, the responsiveness module determines that the responsiveness indicator for the individual grid controllers indicates degradation in response to the status module determining after a predetermined number of status updates that the keepalive status of the individual grid controllers is down. In some embodiments, in response to the status module determining that the keepalive status of the particular grid controller is up, the responsiveness module determines that the responsiveness indicator for the particular grid controller indicates degradation in response to determining that the connectivity indicator of the particular grid controller falls below a predetermined threshold. In certain embodiments, in response to the status module determining that the keepalive status of the particular grid controller is up and that the connectivity indicator of the particular grid controller substantially matches the connectivity indicator of a predetermined number of other individual grid controllers, the responsiveness module determines that the responsiveness indicator for the particular grid controller indicates degradation in response to determining that the pending transaction indicator of the particular grid controller exceeds a predetermined threshold.

In some embodiments, the apparatus includes a ranking module that determines a connectivity ranking and a pending transaction ranking of the particular grid controller and of a predetermined number of other individual grid controllers. In certain embodiments, in response to the status module determining that the keepalive status of the particular grid controller is up, the responsiveness module determines that the responsiveness indicator for the particular grid controller indicates degradation in response to the ranking module determining that the connectivity ranking of the particular grid controller is lower than the connectivity ranking of the predetermined number of other individual grid controllers.

In various embodiments, in response to the status module determining that the keepalive status of the particular grid controller is up and the ranking module determining that the connectivity ranking of the particular grid controller substantially matches the connectivity ranking of a predetermined number of individual grid controllers, the responsiveness module determines that the responsiveness indicator for the particular grid controller indicates degradation in response to the ranking module determining that the pending transaction ranking of the particular grid controller is higher than the pending transaction ranking of the predetermined number of other individual grid controllers.

A method includes collecting a status update for individual grid controllers in a grid array, the status update comprising a keepalive status and at least one of a connectivity indicator between pairs of the individual grid controllers and a pending transaction indicator between pairs of the individual grid controllers. The method, in one embodiment, includes determining a responsiveness indicator for a particular grid controller of the individual grid controller based on the keepalive status, and at least one of an aggregate connectivity indicator and an aggregate pending transaction indicator, for the particular grid controller and removing a particular grid controller from use in the grid array in response to determining that the responsiveness indicator of the particular grid controller indicates that the particular grid controller is degraded.

In some embodiments, collecting the status update includes sending a request for the status update to the individual grid controllers in response to determining that a transaction between the individual grid controllers is stuck. In various embodiments, collecting the status update comprises receiving the status updates sent by the individual grid controllers according to a predetermined schedule. In at least one embodiment, determining the connectivity indicator between pairs of the individual grid controllers is based on all service processes running on the pairs of the individual grid controllers being connected. In certain embodiments, determining that the responsiveness indicator for the particular grid controller indicates degradation comprises determining after a predetermined number of status updates that the keepalive status of the particular grid controller is down. In one embodiment, the method further includes determining a connectivity ranking and a pending transaction ranking for the individual grid controllers.

In various embodiments, the method includes determining that the responsiveness indicator for the particular grid controller indicates degradation in response to determining that the keepalive status of the particular grid controller is up and the connectivity ranking of the particular grid controller is lower than the connectivity ranking of the predetermined number of other individual grid controllers. In one embodiment, the method further includes determining that the responsiveness indicator for the particular grid controller indicates degradation, in response to determining that the keepalive status of the particular grid controller is up and the pending transaction ranking of the particular grid controller is higher than the pending transaction ranking of the predetermined number of other individual grid controllers.

A system includes a grid array that includes one or more individual grid controllers, one of which is a managing grid controller comprising one or more processors configured to execute code to cause the one or more processors to collect a status update for the individual grid controllers in the grid array, the status update comprising a keepalive status and at least one of a connectivity indicator between pairs of the individual grid controllers and a pending transaction indicator between pairs of the individual grid controllers. The code further causes the one or more processors to determine a responsiveness indicator of a particular grid controller of the individual grid controllers based on the keepalive status, and at least one of an aggregate connectivity indicator and an aggregate pending transaction indicator, for the particular grid controller; and to remove the particular grid controller from use in the grid array in response to determining that the responsiveness indicator of the particular grid controller indicates that the particular grid controller is degraded.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Disclosed herein are various embodiments providing methods, systems, and computer program products that can select locations on a storage device based on characterizations of adjacent location errors. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatuses (systems, apparatuses), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements, unless otherwise clear from the context.

Figure 1:
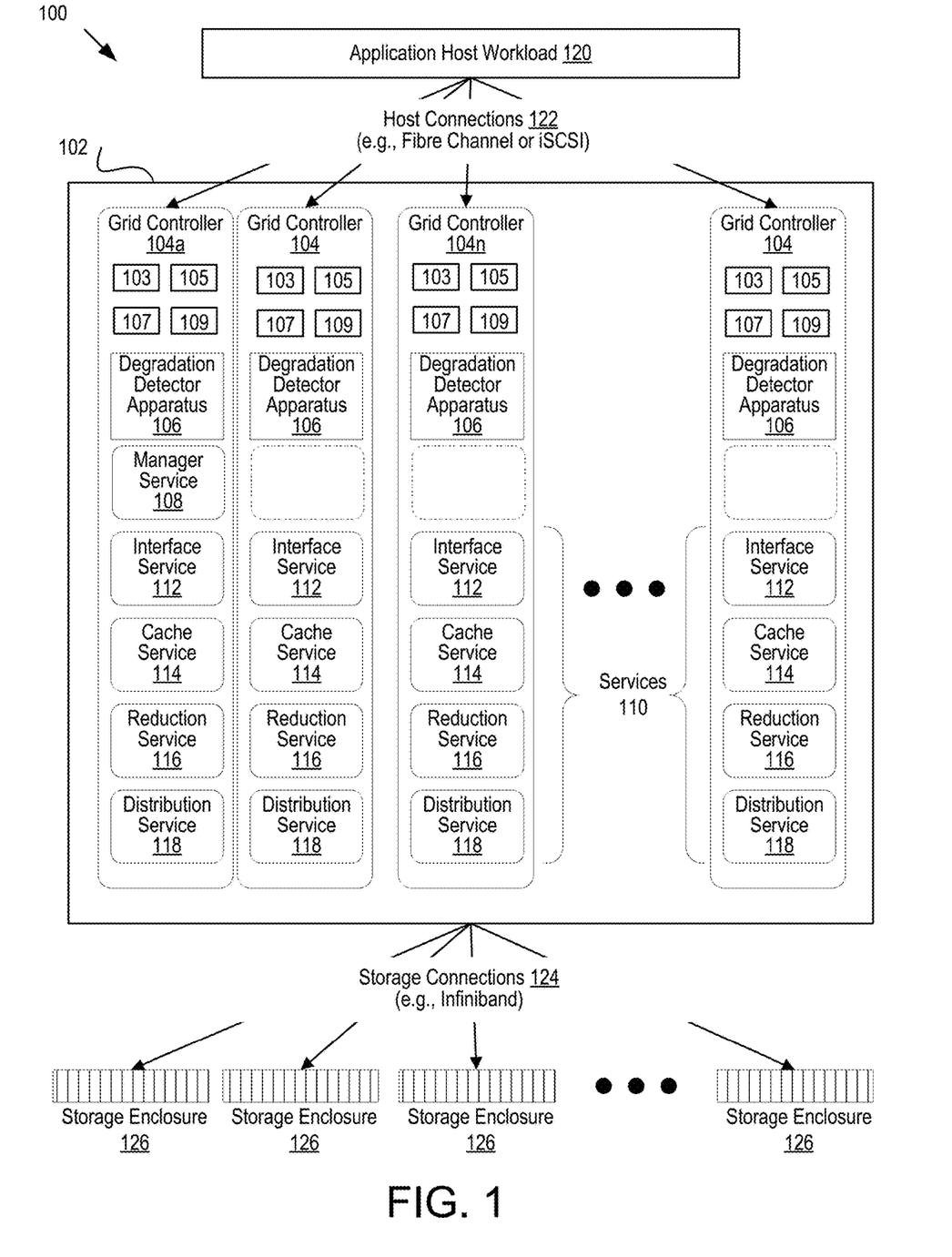
FIG. 1 is a schematic block diagram of one embodiment of a system for detecting a degraded grid controller in a grid array.

FIG. 1 is a block diagram of one embodiment of a system 100 for detecting a degraded grid controller in a grid array. The system 100 includes a grid array 102 that includes multiple grid controllers 104. In various embodiments, the individual grid controllers include one or more processors 103, one or more memories 105, one or more host network adapters 107, and/or one or more storage network adapters 109. At least one of the individual grid controllers 104 includes a degradation detector apparatus 106.

In one embodiment, the degradation detector apparatus 106 collects a status update for individual grid controllers 104 in the grid array. The status update includes a keepalive status and at least one of a connectivity indicator between pairs of the individual grid controllers and a pending transaction indicator between pairs of the individual grid controllers 104. The degradation detector apparatus 106 determines a responsiveness indicator for the individual grid controllers 104 based on the keepalive status and the at least one of the connectivity indicators and the pending transaction indicator. The degradation detector apparatus 106 removes a particular grid controller 104n of the individual grid controllers 104 from use in the grid array 102 in response to determining that the responsiveness indicator of the particular grid controller 104n indicates that the particular grid controller 104n is degraded. Further details with respect to the degradation detector apparatus 106 are provided below with respect to apparatus 200 of FIG. 2 and apparatus 300 of FIG. 3.

In one embodiment, the one or more processors 103 of the individual grid controllers 104 execute code stored in one or more memories 105 to provide various services, such as for example an interface service 112 also called an interface node, that processes host I/Os e.g., via host connections 122 using the one or more host network adapters 107 (e.g., Fibre Channel and/or iSCSI cards), a cache service 114 also called a cache node, that implements and manages caching functions, a reduction service 116, also called a data reduction service/node, that implements data deduplication and compression functions for data that may be stored in local storage devices or in the storage enclosures 126, and a distribution service 118, also called a data distribution service/node, that ensures that distribution information is kept up-to-date for data placement across the storage enclosures 126. The foregoing services 110 (e.g., interface service 112, cache service 114, reduction service 116, and distribution service 118) are merely exemplary and need not be included in various embodiments of the apparatus, method, and system described herein. Moreover, other services 110 may be implemented on the grid controllers 104.

At least one of the grid controllers 104 e.g., 104a includes a manager service 108. The grid array 102 is configured to provide various services 110 to various hosts by processing and/or storing an application host workload 120 which is communicated to the grid controllers 104 of the grid array 102 via host connections 122.

In some embodiments the services such as the interface service 112, the cache service 114, the reduction service 116 and the distribution service 118 have their own physical interconnect channels and/or hardware queue allocated so that communications between services on a particular grid controller 104n and another of the individual grid controllers 104 can occur using multiple threads communicating over the allocated channels in parallel at high speed.

In certain embodiments, the grid controllers 104 store data related to the application host workload 120 to one or more storage enclosures 126 that communicate with the individual grid controllers 104 of the grid array 102 via storage connections 124.

Some modern enterprise applications deploy a grid architecture, where a plurality of grid controllers 104, interconnected with a fast interconnect (e.g., 122, 124) provide application services to service an application host workload 120. For example, Fast Ethernet or Infiniband® are typical interconnect solutions. Due to complex requirements of enterprise applications, various protocols are deployed on the interconnect fabric. Classic protocols, like Ethernet or TCP/IP are not sufficient to satisfy application requirements for performance, load balancing, and data delivery guarantees. Such protocols can be used to communicate over a control path or management path but do not have sufficient bandwidth to be used satisfactorily in the data path.

To provide adequate bandwidth in the data path, these type of applications switch to interconnect protocols that allow hardware level connections and remote direct memory access ("RDMA") transfers. Reliable peer-to-peer connections that are implemented at the host channel adapter ("HCA") level and use of RDMA protocols are possible in Infiniband® and Data Center Bridging ("DCB") Ethernet fabrics. Various DCB technologies are also known under the terms Converged Enhanced Ethernet (CEE) or lossless Ethernet.

Grid architecture solutions support both scalability and high availability. Grids (also referred to herein as grid arrays) can grow by adding grid controllers to the fabric, and if a grid controller fails, the entire grid cluster can reshuffle the workload to remaining grid controllers in the grid. Once the problem with a failed grid controller is solved, the grid can grow again to include the previously failed grid controller.

The term "grid controller" as used herein refers to a server or other computing device that acts as a core component of the grid array and provides interface and compute functions. Sometimes the term "node" has been used to refer to grid controllers. However, in some grid solutions, the term "node" is used to refer to software services such as services 110 that run in a distributed manner on the grid controllers 104. General, the term "grid controllers" rather than "nodes" is used herein to refer to the servers or other computing devices that run the various distributed services 110 unless otherwise clear from context. In some embodiments, the grid controllers 104 may be implemented as virtual machines.

The term "individual grid controllers" is used herein to denote that generally, separate grid controllers within a grid array are similarly configured and perform similar functions so that grid controllers 104 may be added or removed from the array and services may be distributed and redistributed among the grid controllers 104 with the expectation that individual grid controllers are generally configurable to operate interchangeably without significant differences between normally operating grid controllers in available resources and performance. In many circumstances, reference to individual grid controllers 104 is intended to apply generally to each grid controller that is actively participating in the grid array 102.

In some circumstances, one or more particular grid controllers e.g. 104n may be degraded, powered down, unallocated, or otherwise not participating in grid transactions at a particular time. Accordingly, the term "individual grid controllers" is used herein rather than the term "each grid controller" to convey that, under some circumstances, the term "individual grid controllers" refers to a subgroup of the total number of grid controllers in the grid array and excludes this one or more grid controllers that have been removed or are otherwise not participating in a particular grid transaction. Similarly, a reference to "each grid controller" may likewise refer to a subgroup of the total number of grid controllers and may exclude grid controllers that are not participating in a particular grid transaction unless otherwise clear from context.

Similarly, in various embodiments, the term "a predetermined number of other individual grid controllers" may refer generally to each of the individual grid controllers other than the particular grid controller. In some embodiments, certain grid controllers may be temporarily inactive or nonparticipating and the term predetermined number of other individual grid controller may refer to a majority or a specific minimum number or maximum number of grid controllers other than the particular grid controller. In still other embodiments, the "predetermined number of grid controllers" refers to a user-defined or a system-defined number of grid controllers.

To manage the workload distribution and monitor the health status of the grid array, a management solution in the form of a manager service 108 also sometimes referred to as a manager is deployed. Management solutions typically deploy TCP protocol for communication across either data fabric or slower dedicated side network channel.

Typically, all software services (e.g., 110, 114, 116, 118, and so forth) running on the various grid controllers communicate with the manager service 108 of the grid array 102 and exchange keepalive or health messages. The manager service 108 is a process running on one of the grid controllers. The manager service 108 of the grid array 102 can declare a software service as failed if the service reports a failure or is not seen on the management network for a defined period of time. In various embodiments, the manager service 108 can be elected by means of TCP protocol using majority votes, when a predetermined number of services running on the grid controllers 104 in the grid array 102 communicate with each other.

Modern fast interconnect solutions support speeds of 100-200 Gbits per port. In order to achieve such speeds, each service running on a particular grid controller e.g., 104n may communicate with another process running on other grid controllers 104 using multiple parallel threads to transfer data over multiple parallel hardware queues. At such speeds, a port that is capable of negotiating correct speed without encountering errors but that has a physical link problem which is not detected, will quickly cause congestion in network fabric and application flows, if it is not able to handle data at the required speed.

For example, the HCA may have a problem with transferring data to a host memory, because it has a hardware problems with PCI transfers, or because its DMA hardware has a malfunction. Similar problems can occur if applications malfunction and cannot process data at the required speed. In existing grid systems, these failures do not necessarily result in loss of grid controllers on a management network, so the manager service 108 may not fail any grid controller 104. On the other hand, if a local or remote HCA malfunction prevents applications from sending and receiving data with required integrity and speed, applications get "stuck" and are unable to complete transactions. As used herein, the term transaction can be any of various types of transactions involving the grid array such as processing transactions, computing transactions, storage transactions, data transfer transactions, network switching transactions, etc.

Because communications on the data path of the grid array 102 are multithreaded, the failure of any of the hardware queues or threads can cause an application to become stuck, even if the control or management path of a particular grid controller indicates that it is present and alive. Often, disconnecting and reconnecting does not solve an issue, since disconnecting and reconnecting both succeed but the problem repeats since the malfunction remains. As used herein, the term "stuck" can refer to a failure or partial failure to complete a transaction within a predetermined time frame or indefinitely.

Thus, a particular grid controller 104n that is degraded (e.g., slow) in the fabric of the grid array 102 can bring an entire application cluster down, when applications in the cluster are stuck on transactions with the particular grid controller 104n. The term "particular grid controller" and the reference "104n" are used herein to help distinguish a grid controller which the degradation detector apparatus 106 may remove in response to determining the particular grid controller 104n is degraded e.g., relative to a predetermined threshold and/or relative to a predetermine number of other individual grid controllers 104. Depending on whether the degradation detector apparatus 106 determines that it is degraded, any of the individual grid controllers 104 may be referred to herein as a "particular grid controller 104n."

In one embodiment, the system 100 is depicted as a storage grid solution by way of one example. However, one of skill in the art will recognize that the various embodiments of the apparatus, method, and system for detecting a degraded grid controller can be used in a web services grid solution, a compute services grid solution or any grid system that uses a grid architecture.

The various embodiments of the inventive apparatus, method, and system for detecting a degraded grid controller in a grid array described herein provide significant improvement over existing grid systems, methods, and apparatuses, e.g., by processing data collected from individual grid controllers 104 at the level of the grid array 102 (e.g., using the degradation detector apparatus 106 and/or the manager service 108) to determine if any of the individual grid controllers 104 are degraded. This represents an improvement over existing systems because the individual grid controllers are unable to individually determine at a level of an individual grid controller 104 whether or not a particular grid controller is degraded or whether degradation experienced by the particular grid controller is in fact caused by degradation of another grid controller. This hierarchical approach to detecting and/or removing a degraded grid controller (e.g., 104n) in the grid array 102 allows applications to perform better than failure detection approaches that only detect grid controllers that more completely fail to respond e.g., to a keepalive probe sent over the management path.

Figure 2:
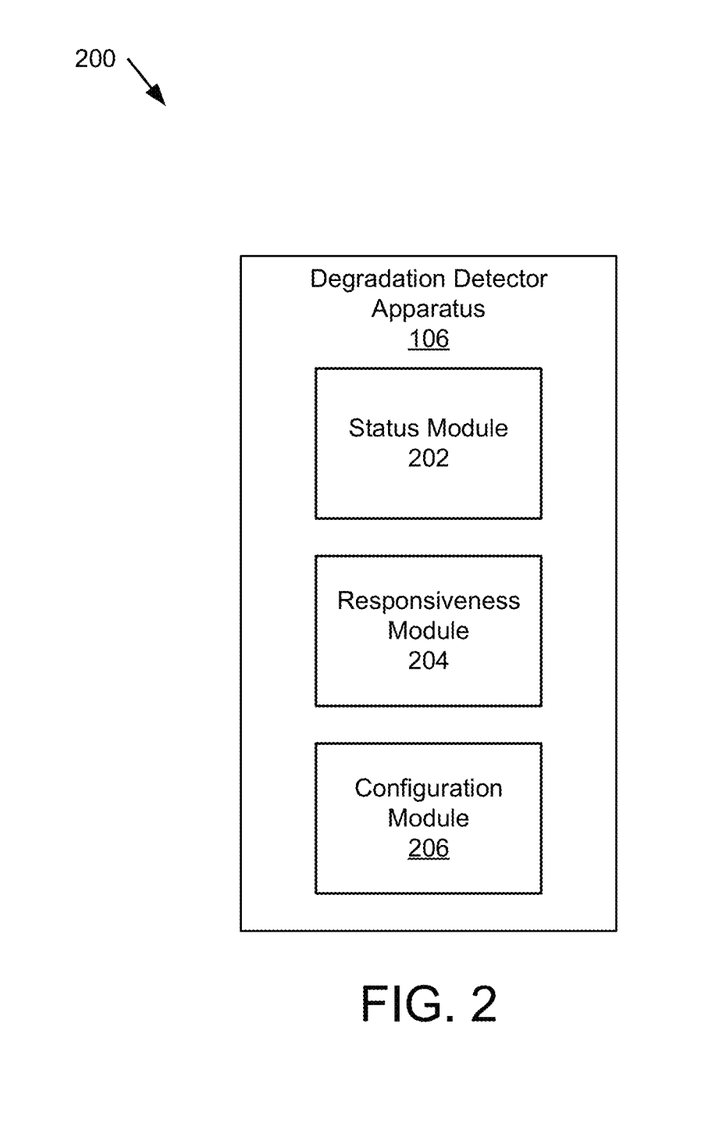
FIG. 2 is a schematic block diagram of one embodiment of an apparatus for detecting a degraded grid controller in a grid array.

Referring now also to FIG. 2, FIG. 2 is a block diagram of one embodiment of an apparatus 200 for detecting a degraded grid controller. The apparatus 200 includes an embodiment of degradation detector apparatus 106 with a status module 202, a responsiveness module 204, and a configuration module 206 which are described below.

The apparatus 200, in one embodiment, includes a degradation detector apparatus 106 disposed in a grid controller 104. The apparatus 200 includes a status module 202 that collects (for individual grid controllers 104 in the grid array 102) a status update comprising a keepalive status and at least one of a connectivity indicator between pairs of the individual grid controllers 104 and a pending transaction indicator between pairs of the individual grid controllers 104. The apparatus 200 also includes a responsiveness module 204 that determines a responsiveness indicator for the individual grid controllers 104 based on the keepalive status and the at least one of the connectivity indicators and the pending transaction indicator. The apparatus 200 further includes a configuration module 206 that removes a particular grid controller e.g., 104n of the individual grid controllers 104 from use in the grid array 102 in response to the responsiveness module 204 determining that the responsiveness indicator of the particular grid controller 104n indicates that the particular grid controller 104n is degraded.

In various embodiments, the status module 202 is implemented, at least in part, on an individual grid controller e.g., 104a that runs the manager service 108. As depicted in FIG. 1, the manager service 108 typically runs on one of the grid controllers e.g., 104a. In some embodiments, any of the individual grid controllers 104 is capable of running the manager service 108. In various embodiments, the grid controller 104a that runs the manager or manager service 108 is elected by the other grid controllers 104. Any existing solutions for electing a manager in the grid array 102 can be used to elect the manager (i.e. manager service 108). For example, U.S. Pat. No. 9,497,080 discloses one approach for election of a manager that controls configuration of an InfiniBand® network.

The manager service 108 is responsible for failing and adding new grid controllers 104 to the grid array 102. In certain embodiments, the manager service 108 uses keepalive probes for grid controllers 104 in the grid array 102. Keepalive probes are typically sent over the management path or control path to get a hardware status (hardware failure detected) or a software status (application alive, application has failed) from individual grid controllers. Keepalive probes generally use classic protocols such as TCP to request and/or receive a keepalive status of the individual grid controllers. The hardware status or software status can be used by the manager service 108 to determine whether to fail a particular grid controller e.g., 104n.

In various embodiments, the status module 202 sends a request for the status update to the individual grid controllers in response to determining that a transaction between individual grid controllers is stuck. In addition to the "I-am-alive" reply, the status update includes a connectivity indicator between pairs of the individual grid controllers 104 and/or a pending transaction indicator between pairs of the individual grid controllers 104.

In other embodiments, the individual grid controllers 104 send the status update to the status module 202 according to a predetermined schedule. For example, a schedule may be predetermined based on the throughput requirements of a particular application taking into account the distribution of the application host workload 120 to the participating individual grid controllers 104. Generally, allocation of more grid controllers 104 reduces the workload that must be handled by each individual grid controller and thus improves the throughput of the grid for handling the application host workload 120.

In certain embodiments, the schedule for sending the status updates to the status module 202 may be communicated to the individual grid controllers 104 whenever the manager service 108 communicates a new distribution table to the participating grid controllers 104. This allows the predetermined schedule to be adjusted as grid controllers are added or removed so as to ensure that the status module 202 receives a status update from the individual grid controllers frequently enough to determine whether or not the grid controllers are providing a predetermined level of responsiveness.

In some embodiments, the degradation detector apparatus 106 includes a responsiveness module 204 that determines a responsiveness indicator for the individual grid controllers 104 based on the keepalive status and the at least one of the connectivity indicator and the pending transaction indicator of the individual grid controllers.

In various embodiments, the responsiveness module 204 processes the keepalive status, the connectivity indicator, and the pending transaction indicator, of the individual grid controllers in an order that optimizes the resource usage of the responsiveness module 204. For example, the responsiveness module 204 may first process the keepalive status of the individual grid controllers 142 determine whether one or more particular grid controllers 104n are "down" or "not alive." In other words, in certain embodiments, the responsiveness module 204 determines that the responsiveness indicator for the individual grid controllers indicates degradation in response to the status module 202 determining after a predetermined number of status updates that the keepalive status of the individual grid controllers is down.

In one embodiment, the responsiveness module 204 may then process the connectivity indicators collected from the individual grid controllers 104 by the status module 202. For example, in response to the status module 202 determining that the keepalive status of the particular grid controller 104n is up, the responsiveness module 204 determines that the responsiveness indicator for the particular grid controller 104n indicates degradation in response to determining that the connectivity indicator of the particular grid controller 104n falls below a predetermined threshold, which may be determined as described above according to throughput need to provide a predetermined level of service for processing the application host workload 120 using the participating number of grid controllers 104.

In various embodiments, even if the keepalive status of a particular grid controller 104n is up and the connectivity indicator of the particular grid controller 104n does not fall below a predetermine threshold, the responsiveness module 204 may still determine that the responsiveness indicator for the particular grid controller 104n indicates degradation in response to determining that a pending transaction indicator of the particular grid controller 104n exceeds a predetermined threshold. In other words, if the particular grid controller 104n is alive and connected but not keeping up with the transactions required to service the application host workload 120 with a predetermined level of service, the responsiveness module 204 may determine that the particular grid controller is degraded. This leads to a description of the next structure and function of the degradation detector apparatus 106.

In certain embodiments, the degradation detector apparatus 106 includes a configuration module 206 that removes a particular grid controller 104n and of the individual grid controllers 104 from use in the grid array 102 in response to the responsiveness module 204 determining that the responsiveness indicator of the particular grid controller 104n indicates that the particular grid controller 104n is degraded.

In some embodiments, if a service 110, such as the cache service 114 or the reduction service 116 (i.e., data reduction service) is unresponsive, the responsiveness module determines that a particular grid controller 104n is degraded and the particular grid controller 104n that is degraded is removed from use in the grid array 102 (at least temporarily) and the service 110 is expelled from the particular grid controller 104n that is degraded and workload for providing the service 110 is taken over by other grid controllers 104.

In certain embodiments, a system which is equipped with three grid controllers, can stand removal of one degraded grid controller and continue operating. Similarly, a system which has a minimum of four grid controllers, can stand two simultaneous removals of the particular grid controllers 104n that are degraded. In some embodiments of a four grid controller system, the detection and/or removal of one additional (e.g., third) degraded grid controller (an unlikely event) triggers a graceful system shutdown.

In various embodiments, the configuration module 206 is incorporated into or communicates with the manager service 108. In such embodiments, the configuration module 206 improves the functionality of the manager service 108 by removing a particular grid controller 104n from use in the grid array 102 not only in response to determining that the keepalive status of the particular grid controller 104n indicates that the grid controller is "down" i.e., experiencing a failure that affects management/control paths but beneficially also removes a particular grid controller 104n whose keepalive status indicates that the particular grid controller is "up" (e.g., up and running or alive) but whose connectivity indicator and/or pending transaction indicator indicates that the particular grid controller 104n is degraded or, is the grid controller 104 most likely to be the source of a detected problem.

Figure 3:
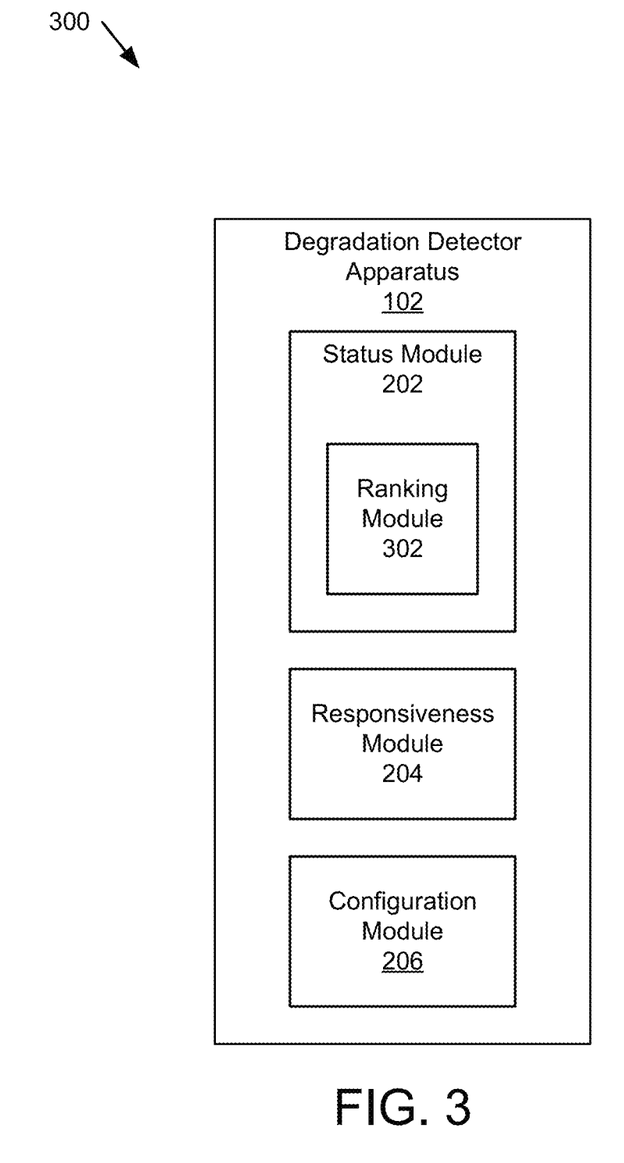
FIG. 3 is a schematic block diagram of another embodiment of an apparatus for detecting a degraded grid controller in a grid array.

FIG. 3 is a schematic block diagram of another embodiment of an apparatus 300 for detecting a degraded grid controller in a grid array. In one embodiment the apparatus 300 includes a status module 202, a responsiveness module 204, and a configuration module 206 that have substantially similar structures and functions to the apparatus 200 described above with respect to FIG. 2. In some embodiments, the apparatus 300 further includes a ranking module 302 that determines a connectivity ranking and a pending transaction ranking of the particular grid controller 104n and others of the individual grid controllers 104.

In various embodiments, the responsiveness module determines that the responsiveness indicator for the particular grid controller indicates degradation in response to the ranking module 302 determining that the connectivity ranking of the particular grid controller 104n is lower than the connectivity ranking of a predetermined number of other individual grid controllers 104. For example, in one embodiment, the status module 202 starts with a conductivity score of zero for a predetermined number of individual grid controllers such as for example each individual grid controller or each participating individual grid controller and determines a connectivity score for the particular grid controller 104n by collecting the conductivity indicator between the particular grid controller 104n paired with each of the other individual grid controllers and counting up the total number of grid controllers 104 that the particular grid controller 104n is connected to as indicated by the conductivity indicator. In other words, the connectivity score for the particular grid controller 104n may be determined by the status module 202 to be the total number of individual grid controllers to which the particular grid controller 104n is connected.

The ranking module 302 which may be incorporated in or communicating with the status module 202 may then sort conductivity scores for all of the participating individual grid controllers 104 including the particular grid controller 104n to determine a ranking for the particular grid controller 104n. The responsiveness module 204 may then determine that the responsiveness indicator for the particular grid controller indicates degradation in response to the ranking module 302 determining that the conductivity ranking of the particular grid controller 104n is lower than the connectivity ranking of a predetermined number of other individual grid controllers 104. In other words, the responsiveness module 204 determines which of the individual grid controllers 104 has the lowest connectivity score and the configuration module removes the particular grid controller 104n with the lowest connectivity ranking.

In certain embodiments, in response to the status module 202 determining that the keepalive status of the particular grid controller 104n is up and the ranking module 302 determining that the connectivity ranking of the particular grid controller 104n substantially matches the connectivity ranking of one or more others of the individual grid controllers, the responsiveness module 204 determines that the responsiveness indicator for the particular grid controller 104n indicates degradation in response to the ranking module 302 determining that the pending transaction ranking of the particular grid controller is higher than the pending transaction ranking of a predetermined number of other individual grid controllers 104.

In other words, if the keepalive status of a particular grid controller 104n is up (i.e., "I-am-alive") and if the connectivity ranking of the particular grid controller 104n substantially matches the connectivity ranking of a predetermined number of other individual grid controllers 104, then the responsiveness module 204 looks to the pending transaction ranking to determine whether the particular grid controller is degraded. In various embodiments, the status module 202 first determines a pending transaction score for the individual grid controllers 104 including the particular grid controller 104n. For example, the status module 202 may determine the pending transaction score as being the total number of pending transactions, i.e. transactions that have not completed at the time the pending transaction indicator is sent to the status module 202.

In some embodiments, the total number of pending transactions includes different types of transactions for different types of services involving a pair of individual grid controllers. In certain embodiments, the status module 202 counts the number of pending transactions for a predetermined number of services 110 between the particular grid controller 104 as paired with each of the other individual grid controllers 104. In various embodiments, the predetermined number of services means all services. In other embodiments, some of the services may be optional and the predetermined number of services may mean all essential services or may refer to all currently active services. A few simplified examples describing exemplary structures and functions of the status module 202, the ranking module 302, the responsiveness module 204, and the configuration module 206 are provided below with respect to FIG. 4 and FIG. 5.

Figure 4:
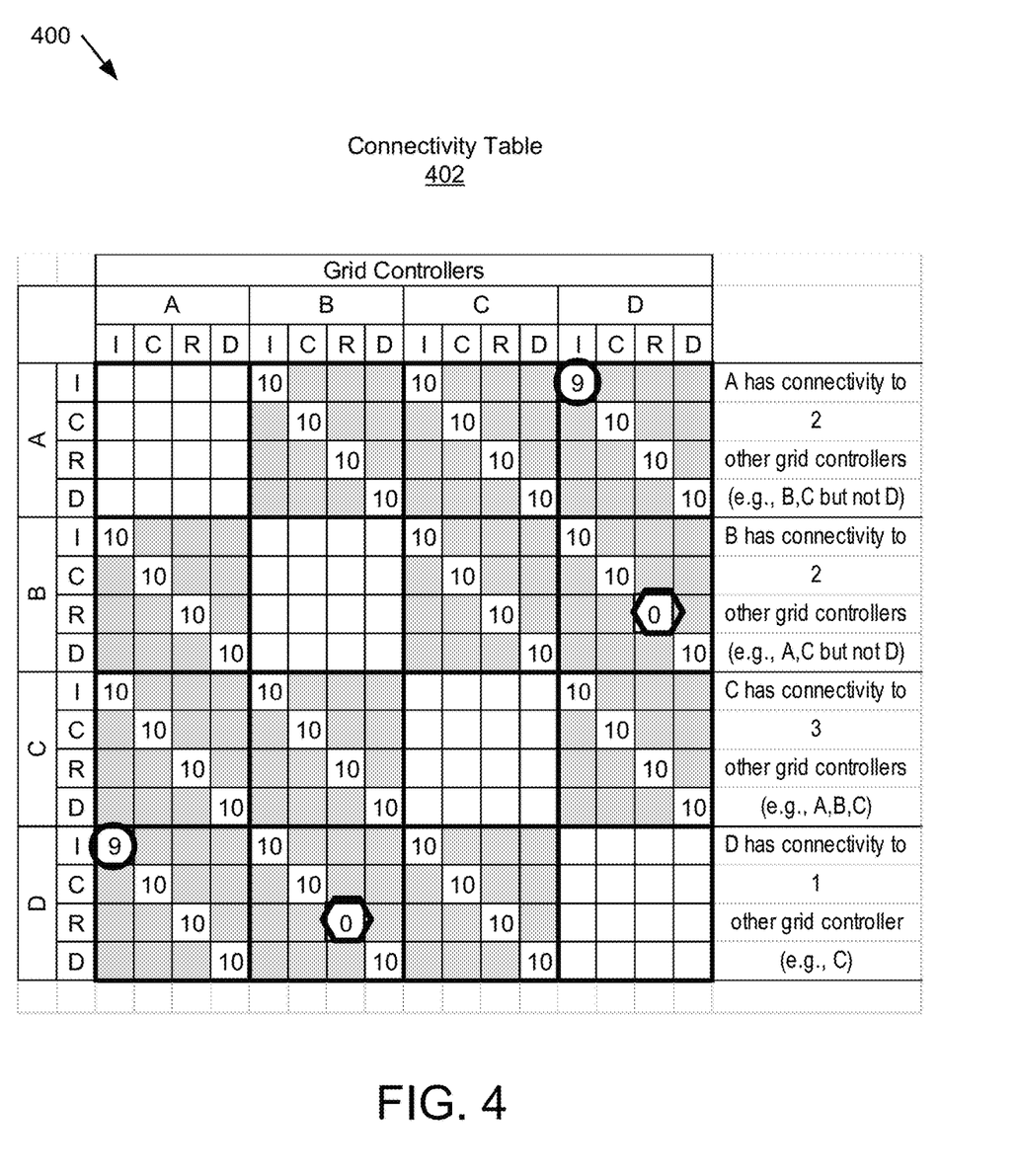
FIG. 4 is a schematic block diagrams illustrating one embodiment of a connectivity indicator for detecting a degraded grid controller in a grid array.
Figure 5:
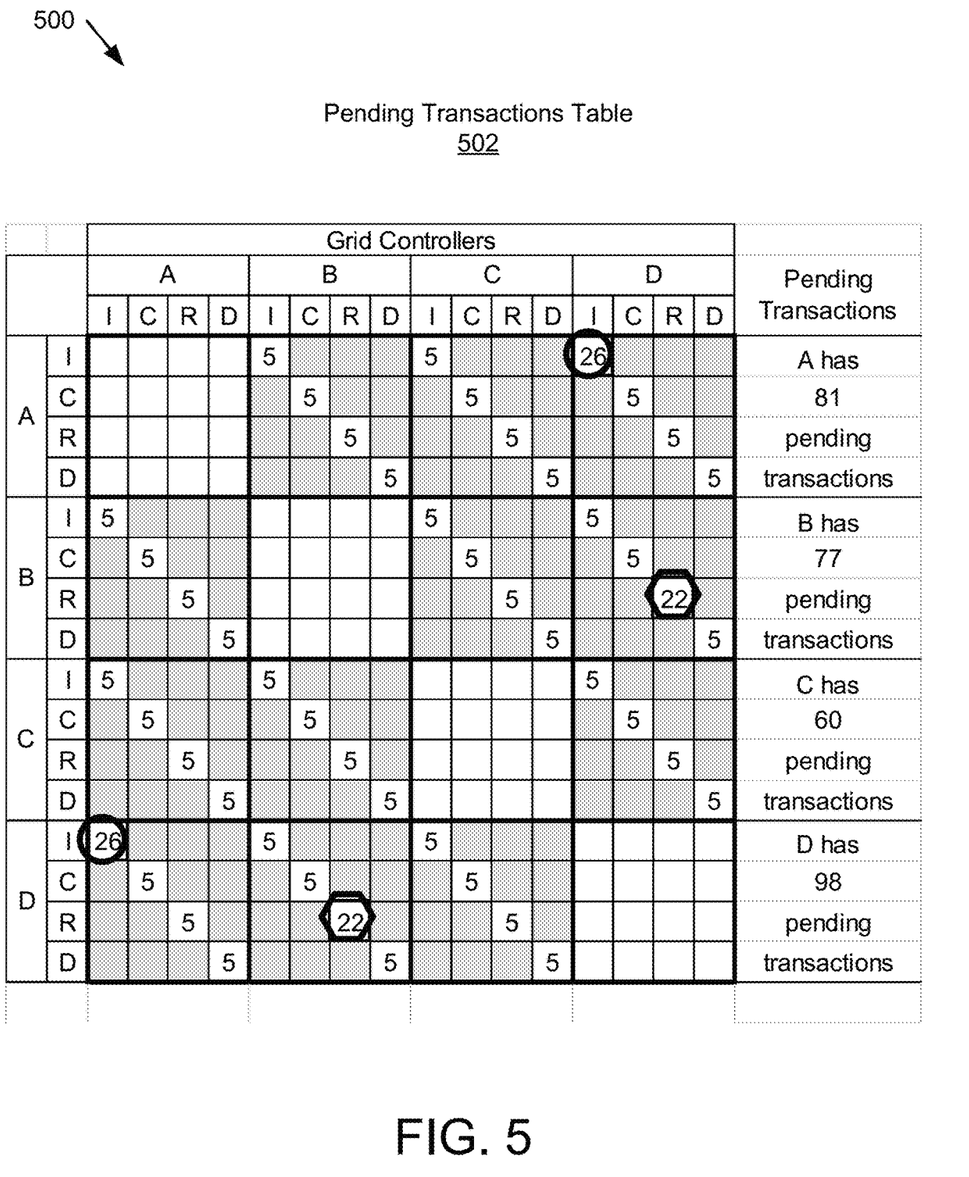
FIG. 5 is a schematic block diagrams illustrating one embodiment of a pending transaction indicator for detecting a degraded grid controller in a grid array.

FIG. 4 is a schematic block diagrams illustrating one embodiment of a connectivity indicator 400 for detecting a degraded grid controller in a grid array and FIG. 5 is a schematic block diagrams illustrating one embodiment of a pending transaction indicator 500 for detecting a degraded grid controller in a grid array. The term "indicator" as used herein refers to data or expressions that measure, show, point out, distinguish, make known, or otherwise provide evidence of a condition or event such as connectivity between pairs of grid controllers 104 and/or pending transactions between pairs of grid controllers 104. An indicator may be a table, a count, a total, a score, a ranking, an average, a categorization, and so forth. An indicator may be aggregate or composite of data or expressions e.g., that indicate connectivity and/or pending transactions between pairs of grid controllers.

In certain embodiments, the connectivity indicator 400 is a connectivity table 402 which in some embodiments is referred to as a connectivity bitmap. The connectivity table 402 provides a simplified example of one approach for implementing a connectivity indicator between pairs of individual grid controllers 104.

In the embodiment, the connectivity table 402 is arranged in four columns (A,B,C, and D) where each column represents a grid controller A, B, C, or D. Corresponding rows A, B, C, and D also represent grid controllers A, B, C, and D for ease of visualization and tabulation. In one embodiment, six of the major squares (depicted with thick borders) in the connectivity table represent the 6 possible pairs of grid controllers i.e., A-B, A-C, A-D, B-C, B-D, and C-D. Some transactions may involve data paths that pass through several different pairs of grid controllers 104 in the fabric of the grid array 102. By detecting hardware and/or software problems involving particular pairs of grid controllers, the degradation detector apparatus determine which particular grid controller may be the likely source of the problems and remove that particular grid controller 104n from having the application host workload 120 distributed to the particular grid controller 104n until the problems are resolved.

In some embodiments, the status module 202 determines the connectivity indicator between pairs of the individual grid controllers 104 based on a predetermined number of services 110 involving the pairs of the individual grid controllers being connected. In some embodiments, the predetermined number of service is all services. In other embodiments, the predetermined number of services is all active services.

In some embodiments, even if a particular pair of individual grid controllers 104 e.g., A-D or B-D can communicate over with each other management or control paths e.g., via keepalive probes and responses or other mechanisms using classic protocols such as TCP, that does not mean that connectivity between the particular pair of individual grid controllers 104 is acceptable i.e. is not degraded.

Within each major square of connectivity table 402 of FIG. 4, there are four minor squares (depicted with thinner borders than the major squares) that represent pairs of services 110 involved in transaction between a particular grid controller pair. The interface service 112 between pairs of grid controllers are abbreviated as "I", the cache service 114 between pairs of grid controllers is abbreviated as "C", the reduction services 116 is abbreviated as "R" and the distribution service is abbreviated as "D". In some embodiments such as the simplified example of FIG. 4, connectivity between pairs of grid controllers is assumed to be determined the same for grid controller pair A-B as for grid controller pair B-A. In other words, if transactions between the grid controller pair A to B indicate connectivity then the direction of the transactions e.g., A→B or B→A does not matter. In other embodiments, the direction of the transactions can be taken into account.

As mentioned above with respect to FIG. 1, each of the services 110 running on a particular grid controller e.g., 104n may communicate with another process running on other grid controllers 104 using multiple parallel threads to transfer data over multiple parallel hardware queues. In the example of FIG. 4, assume that each transaction between services on a pair of grid controllers involves 10 threads using 10 parallel data paths to complete the transaction. If any one of the threads fails to complete e.g. within a predetermined timeframe, then the transaction is deemed to be stuck.

For example, in FIG. 4, the entry illustrating connectivity between interface services 112 ("I") running on grid controller A and grid controller D shows a "9" (marked with a circle) to illustrate that only nine of the ten interface service threads are connected, and thus only nine of ten threads can successfully complete the A-D interface transactions within the predetermined time. This could happen, for example, if one of the hardware queues used by one of the 10 threads had a problem or as another example if one of the 10 threads hangs or gets stuck. Similarly, connectivity between grid controllers B and D shows that zero of 10 threads involved in reduction services (abbreviated as "R") are connected. Again, this could indicate either a hardware problem or a software problem involving grid controllers B and/or D.

In various embodiments, the individual grid controllers 104 keep track internally of the aggregate connectivity score status of various threads, such as the ten threads for each of the services 110 (e.g., the I, C, R, and D services) which require connectivity between pairs of grid controllers 104 illustrated in the minor squares of connectivity table 402 in FIG. 4. In some embodiments, this aggregate status is stored locally in shared memory in the individual grid controllers 104. In other words, the various services 110 can update their aggregate status towards individual grid controllers as each thread handles connectivity events and updates the shared memory.

In the above example of one of the nine threads involved in an interface service transaction getting stuck (depicted with a circle in FIG. 4), a particular grid controller such as grid controller A or grid controller D cannot determine by itself whether it is the source of the problem or whether the other grid controller in the connection pair is the source of the problem. In existing systems, if grid controller A and grid controller D are both alive as indicated by the keepalive status, and the fact that one or more of the threads involved in processing transactions between the A-D grid controller pair do not successfully complete within a predetermined time frame will not be detected which can result in an overall degradation of the grid array 102. Similarly, the data reduction services on grid controllers B and D cannot determine by itself whether it is the source of the problem or whether the other grid controller in the connection pair is the source of the problem. However, the degradation detector apparatus 102, can determine that the source of the problem is the grid controller D, since it has a lower connectivity score (it is not fully connected with two grid controllers and is likely to be the source of the problem).

Referring now to FIG. 5, FIG. 5 is a schematic block diagrams illustrating one embodiment of a pending transaction indicator 500 for detecting a degraded grid controller in a grid array. In some embodiments, the pending transaction indicator 500 includes a pending transaction table 502 that is arranged substantially similarly to the connectivity table 402 depicted in FIG. 4, i.e., depicting four grid controllers A, B, C, and D. The major squares (thick borders) of the pending transaction table 502 represent pending transactions between pairs of grid controllers, e.g., A-B, A-C, A-D, B-C, B-D, and C-D). The minor squares (thinner borders) of the depicted pending transaction table represent pending transactions related to services 110 running on the grid controller 104, e.g., the interface services 112 ("I"), the cache services 114 ("C"), the reduction services 116 ("R"), and the distribution services "D".

In some embodiments, the pending transaction scores for the individual grid controllers 104 and the connectivity scores for the same individual grid controllers 104 may indicate different degradation ratings, if only connectivity score is taken into account. This is because a pair of grid controllers may have some connectivity indicated but if a particular grid controller 104n is operating more slowly than other grid controllers 104, the particular grid controller may build up a queue of more pending transactions, which leads the ranking module 302 to determine that the pending transaction ranking of the particular grid controller 104n is higher than the pending transaction ranking of a predetermined number of other individual grid controllers 104.

In other words, in various embodiments, the status module 202 determines a pending transaction score for each of the individual grid controllers including the particular grid controller 104n which the ranking module then sorts and ranks the grid controllers in order based on the total number of pending transactions for a predetermined number of services involving the particular grid controller 104n and each of the other individual grid controllers 104. The responsiveness module 204 then looks for the particular grid controller that has the highest ranking with respect to the number of pending transactions.

In one embodiment as depicted in FIG. 5, assume for simplicity of illustration that each of the services I, C, R, and D has a type queue of five pending transactions but that certain particular services for one or more particular grid controllers have more than five pending transactions which may be pending transaction indicators that indicate that the particular grid controller is degraded e.g., unresponsive or less responsive than sufficient to meet a predetermined level of performance for handling the application host workload 120.

In one embodiment, the status module 202 determines a pending transaction indicator which may in certain embodiments include a pending transaction score calculated, by summing up the total number of pending transactions between pairs of a particular grid controller e.g. 104n with a predetermined number of other individual grid controllers 104. For example, a partial pending transaction score for grid controller C may be calculated as 20 pending transactions total between the pair of grid controller C and grid controller A. Between the pair of grid controller C and grid controller B there are also 20 pending transactions total. And between the pair of grid controller C and grid controller D there are likewise 20 pending transactions total. Summing the grand total of all grid transactions between the grid controller C and the other grid controllers, e.g., A, B, and D the status module 202 determines a pending transaction score for grid controller C to be 20+20+20=60. In various embodiments, such a pending transaction score may be a pending transaction indicator that meets or exceeds a predetermined threshold and thus, grid controller C is functioning as expected. For example, FIG. 5 depicts that there are 26 pending transactions (marked with a circle) related to the interface services 112 between grid controller D and grid controller A. Similarly, FIG. 5 depicts that there are 22 pending transactions (marked with a hexagon) for reduction services between grid controller D and grid controller B.

Thus, the total pending transaction score for grid controllers A, B, and D using a simple summing algorithm can be calculated in such an embodiment respectively as 81, 77, and 98. In some embodiments, the responsiveness module 204 determines that the responsiveness indicator for the individual grid controllers indicates degradation in response to determining that the pending transaction indicator the particular grid controller exceeds a predetermined threshold. For example, using an algorithm in which a predetermined threshold of 80 or greater total pending transactions indicates degradation, the grid controller A with its pending transaction score of 81 and the grid controller D with its pending transaction score of 98 would both be determined to exceed the predetermined threshold and thus indicating that the grid controller A and the grid controller D are degraded.

In some embodiments, the ranking module 302 ranks the grid controllers A, B, C, D according to the number of pending transactions. The ranking module 302 of the status module 202 determines that the pending transaction ranking of grid controller D (e.g., based on its pending transaction score of 98) is higher than the pending transaction ranking of the predetermined number of other individual controllers (e.g. A, B, C). The responsiveness module 204 would, in response, determine that the responsiveness indicator for the grid controller D indicates that grid controller D is degraded. Accordingly, the configuration module 206 then removes grid controller D from use in the grid array 102, and the manager service 108 of the grid controller 104a would then update the distribution table taking into account the fact that grid controller D has been removed.

In some embodiments, the ranking module 302 ranks the grid controllers A, B, C, D according to the number of individual service-to-service connections that exceed a predetermined pending transactions number. For example, that number can be defined to be equal to 10. The responsiveness module 204 would, in response, determine that the responsiveness indicator for the grid controller D shows a problem in two service connections, while grid controllers A and B have a problem in one service connection. In the case of grid controllers A and B, both problematic connections are towards grid controller D. The responsiveness module 204 would, in response, determine that the responsiveness indicator for the grid controller D indicates that grid controller D is degraded, and the configuration module 206 would proceed to remove grid controller D from use in the grid array 102

In the various embodiments, if the particular grid controller 104n that is degraded is the grid controller running the manager service 108, then the other grid controllers may elect a new manager i.e. a new grid controller to run the manager service 108. If and/or when the particular grid controller 104n that is degraded is repaired or otherwise made to perform suitably, the particular grid controller 104n may be again added for use in the grid array 102.

The embodiment depicted in FIG. 5 is merely one example of a simple summing algorithm that may be used for calculating or determining a pending transaction indicator, and/or a pending transaction ranking. A person of ordinary skill in the art will recognize that various other algorithms may be utilized, and additional factors may be included and/or weighted to calculate or determine a pending transaction indicator, and or a pending transaction ranking.

Figure 6:
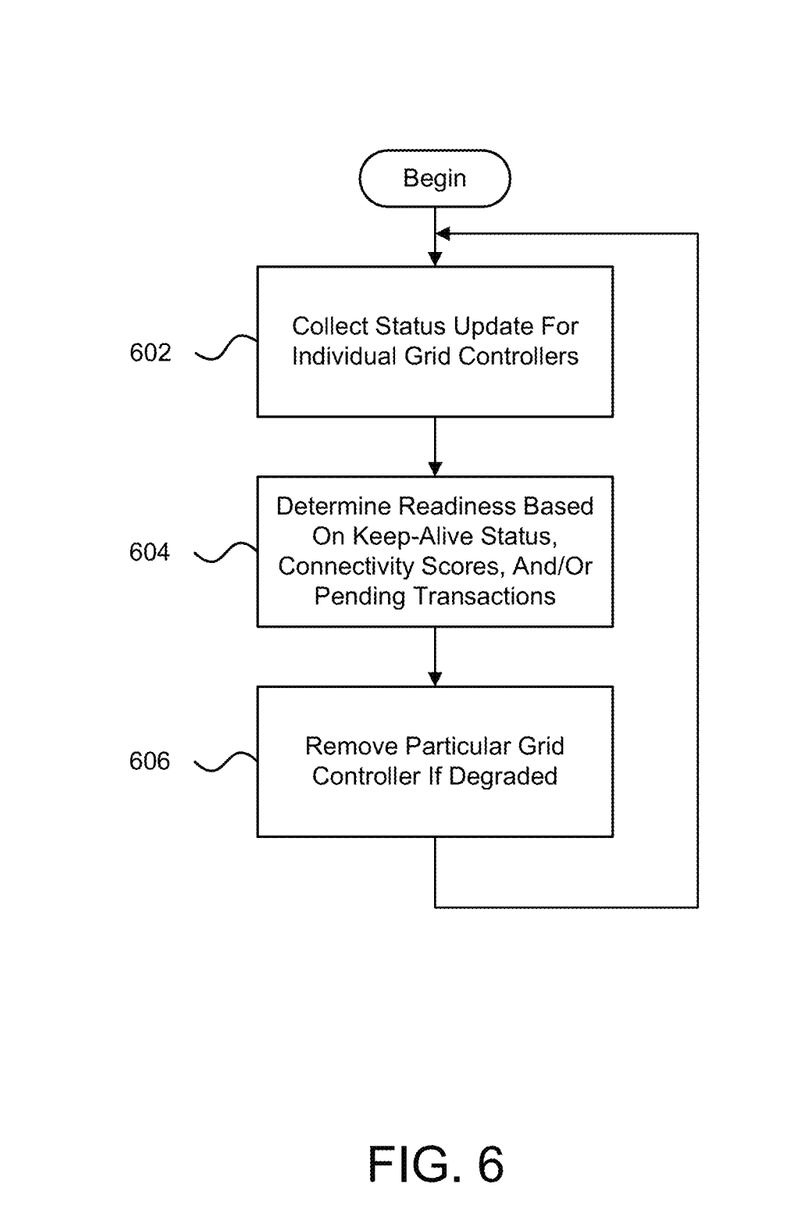
FIG. 6 is a flowchart diagram illustrating one embodiment of a method for detecting a degraded grid controller in a grid array.

FIG. 6 is a flowchart diagram illustrating one embodiment of a method 600 for detecting a degraded grid controller in a grid array. In one embodiment, the method 600 begins and includes collecting 602 a status update for individual grid controllers in a grid array, the status update comprising a keepalive status and at least one of a connectivity indicator between pairs of the individual grid controllers and a pending transaction indicator between pairs of the individual grid controllers. The method 600 continues and includes determining 604 a responsiveness indicator for the individual grid controllers based on the keepalive status and the at least one of the connectivity indicators and the pending transaction indicator. The method 600 continues and further includes removing 606 a particular grid controller of the individual grid controllers from use in the grid array in response to determining that the responsiveness indicator of the particular grid controller indicates that the particular grid controller is degraded. In various embodiments, the method 600 then continues and repeats. In some embodiments, the status module 202, the responsiveness module 204, and/or the configuration module 206 perform one or more of the steps of the method 600.

Figure 7:
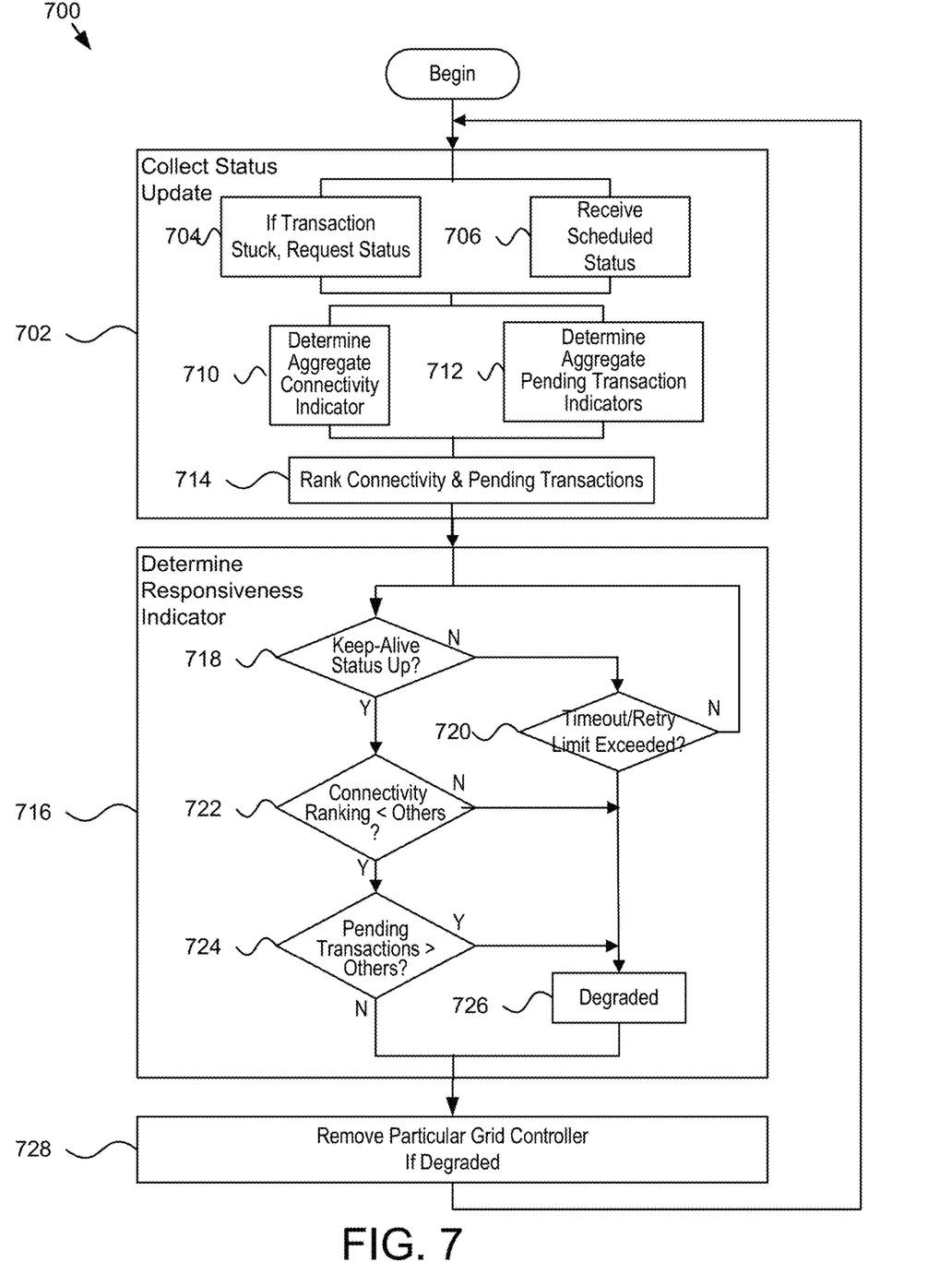
FIG. 7 is a flowchart diagram illustrating another embodiment of a method for detecting a degraded grid controller in a grid array.

FIG. 7 is a flowchart diagram illustrating another embodiment of a method 700 for detecting a degraded grid controller in a grid array. In one embodiment, the method 700 begins and collects 702 a status update for individual grid controllers in a grid array, the status update including a keepalive status and at least one of a connectivity indicator between pairs of the individual grid controllers and a pending transaction indicator between pairs of the individual grid controllers.

In at least one embodiment of the method 700, collecting the connectivity indicator between pairs of the individual grid controllers includes determining 710 an aggregate connectivity indicator for a particular grid controller e.g. such as a connectivity score based on the connectivity indicators between pairs of the individual grid controllers.

In certain embodiments the method 700 requests 704 the status update from the individual grid controllers in response to determining that a transaction between individual grid controllers is stuck. In various embodiments, a transaction is stuck, if the transaction, or a portion thereof, does not complete within a predetermined time. In various embodiments, the method 700 receives 706 a status update sent by the individual grid controllers according to a predetermined schedule. The predetermined schedule may be based upon the throughput or performance requirements of the grid system, the application host workload, or various components, paths, and channels used in the grid system.

In one embodiment the method 700 determines 710 an aggregate connectivity indicator for a particular grid controller. For example, in some embodiments, an aggregate connectivity indicator may be a total count of the others of the individual grid controllers to which a particular grid controller is connected for all service processes running on the pair of the particular grid controller pair with individual grid controllers.

In certain embodiments, the method 700 determines 712 an aggregate pending transaction indicator for the particular grid controller, such as a total number of pending transactions between the particular grid controller and others of the individual grid controllers. As described with respect to FIG. 4 and FIG. 5, various algorithms for determining an aggregate connectivity indicator and/or an aggregate pending transaction indicator include scoring, counting, sorting, ranking, weighting, filtering and so forth, may be used by the method 700 to determine the aggregate connectivity indicator and the aggregate pending transaction indicator for the particular grid controller. In certain embodiments, the method 700 determines 714 a connectivity ranking and/or a pending transaction ranking for the particular grid controller based on the aggregate connectivity indicator and the aggregate pending transaction indicator for the particular grid controller.

In various embodiments, the method 700 determines 716 a responsiveness indicator for a particular grid controller of the individual grid controllers based on, the keepalive status and at least one of an aggregate connectivity indicator and an aggregate pending transaction indicator, for the particular grid controller. In one embodiment, the method 700 determines 718 whether the keepalive status of the particular grid controller is down, and if so, the method 700 continues looping until after a predetermined number of status updates 720 to determine 718 whether the keepalive status of the particular grid controller is down before determining that the particular grid controller is degraded.

In some embodiments, in response to determining 718 that the keep-alive status of the particular grid controller is "up" (i.e., "I-am-alive") the method 700 determines 722 that the particular grid controller is degraded in response to the connectivity ranking and/or score of the particular grid controller being lower than the connectivity ranking of others of the particular grid controller. In certain embodiments, if the connectivity ranking and/or score of the particular grid controller is the same as or higher that other of the individual grid controllers, the method 700 continues and determines 724 whether the pending transaction ranking and/or score of the particular grid controller is higher than others of the individual grid controllers and if so, determines 726 that the particular grid controller is degraded.

In some embodiments, if the method 700 determines that the particular grid controller has the same number or a lower number of pending transactions, the method 700 determines that the particular grid controller is not degraded. In other embodiments, determining whether a particular grid controller is degraded is based on whether the connectivity score and/or ranking of particular grid controller is lower than a predetermined level and/or whether the pending transaction score or ranking is higher than a predetermined level. In other words, in certain embodiments the responsiveness indicator for a particular grid controller is compared against a predetermined fixed or variable standard and in other embodiments the responsiveness indicator for a particular grid controller is compared against the connectivity indicators and/or the pending transaction indicators for others of the individual grid controllers. In various embodiments, the method 700 then continues and repeats. In some embodiments, the status module 202, the ranking module 302, the responsiveness module 204, and/or the configuration module 206 perform one or more of the steps of the method 700.

In one embodiment, the method 700 removes 728 the particular grid controller from use in the grid array in response to determining 726 that the responsiveness indicator of the particular grid controller indicates that the particular grid controller is degraded. For example, the method deallocates services or other processes from being executed on the particular grid controller. In other embodiments, the method 700 changes the status of the particular grid control to an offline status.

In one embodiment, a system for implementing the method 600 and/or the method 700 includes a grid array comprising one or more individual grid controllers, one of which is a managing grid controller comprising one or more processors configured to execute code to cause the one or more processors to collect a status update for the individual grid controllers in the grid array, the status update comprising a keepalive status and at least one of a connectivity indicator between pairs of the individual grid controllers and a pending transaction indicator between pairs of the individual grid controllers. In one embodiment, the one or more processors are configured to execute code to cause the one or more processors to determine a responsiveness indicator of a particular grid controller of the individual grid controllers based on the keepalive status, and at least one of an aggregate connectivity indicator and an aggregate pending transaction indicator, for the particular grid controller and to remove the particular grid controller from use in the grid array in response to determining that the responsiveness indicator of the particular grid controller indicates that the particular grid controller is degraded.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   a status module that collects for individual grid controllers in a grid array a status update comprising a keepalive status and at least one of a connectivity indicator between pairs of the individual grid controllers and a pending transaction indicator between pairs of the individual grid controllers;
   a responsiveness module that determines a responsiveness indicator for a particular grid controller of the individual grid controllers based on, the keepalive status and the at least one of the connectivity indicator and the pending transaction indicator, of the particular grid controller; and
   a configuration module that removes the particular grid controller of the individual grid controllers from use in the grid array in response to the responsiveness module determining that the responsiveness indicator of the particular grid controller indicates that the particular grid controller is degraded,
   wherein at least a portion of each of said modules comprises one or more of a set of hardware circuits, a set of programmable hardware devices, and executable code stored on a set of non-transitory computer-readable storage media.

2. The apparatus of claim 1, wherein the status module sends a request for the status update to the individual grid controllers in response to determining that a transaction between the individual grid controllers is stuck.

3. The apparatus of claim 1, wherein the individual grid controllers send the status update to the status module according to a predetermined schedule.

4. The apparatus of claim 1, wherein the status module determines the connectivity indicator between pairs of the individual grid controllers based on a predetermined number of services involving the pairs of the individual grid controllers being connected.

5. The apparatus of claim 4, wherein the status module determines the connectivity indicator for the particular grid controller to be a total number of individual grid controllers to which the particular grid controller is connected.

6. The apparatus of claim 1, wherein the responsiveness module determines that the responsiveness indicator for the individual grid controllers indicates degradation in response to the status module determining after a predetermined number of status updates that the keepalive status of the individual grid controllers is down.

7. The apparatus of claim 1, wherein in response to the status module determining that the keepalive status of the particular grid controller is up, the responsiveness module determines that the responsiveness indicator for the particular grid controller indicates degradation in response to determining that the connectivity indicator of the particular grid controller falls below a predetermined threshold.

8. The apparatus of claim 1, wherein in response to the status module determining that the keepalive status of the particular grid controller is up and that the connectivity indicator of the particular grid controller substantially matches the connectivity indicator of a predetermined number of other individual grid controllers, the responsiveness module determines that the responsiveness indicator for the particular grid controller indicates degradation in response to determining that the pending transaction indicator of the particular grid controller exceeds a predetermined threshold.

9. The apparatus of claim 1, further comprising a ranking module that determines a connectivity ranking and a pending transaction ranking of the particular grid controller and of a predetermined number of other individual grid controllers.

10. The apparatus of claim 9, wherein in response to the status module determining that the keepalive status of the particular grid controller is up, the responsiveness module determines that the responsiveness indicator for the particular grid controller indicates degradation in response to the ranking module determining that the connectivity ranking of the particular grid controller is lower than the connectivity ranking of the predetermined number of other individual grid controllers.

11. The apparatus of claim 9, wherein in response to the status module determining that the keepalive status of the particular grid controller is up and the ranking module determining that the connectivity ranking of the particular grid controller substantially matches the connectivity ranking of one or more others of the individual grid controllers, the responsiveness module determines that the responsiveness indicator for the particular grid controller indicates degradation in response to the ranking module determining that the pending transaction ranking of the particular grid controller is higher than the pending transaction ranking of the predetermined number of other individual grid controllers.

12. A method comprising:
    collecting a status update for individual grid controllers in a grid array, the status update comprising a keepalive status and at least one of a connectivity indicator between pairs of the individual grid controllers and a pending transaction indicator between pairs of the individual grid controllers;
    determining a responsiveness indicator for a particular grid controller of the individual grid controllers based on the keepalive status, and at least one of an aggregate connectivity indicator and an aggregate pending transaction indicator, for the particular grid controller; and
    removing the particular grid controller from use in the grid array in response to determining that the responsiveness indicator of the particular grid controller indicates that the particular grid controller is degraded.

13. The method of claim 12, wherein collecting the status update comprises sending a request for the status update to the individual grid controllers in response to determining that a transaction between the individual grid controllers is stuck.

14. The method of claim 12, wherein collecting the status updates comprises receiving the status updates sent by the individual grid controllers according to a predetermined schedule.

15. The method of claim 12, wherein determining the connectivity indicator between pairs of the individual grid controllers is based on all service processes running on the pairs of the individual grid controllers being connected.

16. The method of claim 12, wherein determining that the responsiveness indicator for the particular grid controller indicates degradation comprises determining after a predetermined number of status updates that the keepalive status of the particular grid controller is down.

17. The method of claim 12, further comprising determining a connectivity ranking and a pending transaction ranking for the individual grid controllers.

18. The method of claim 17, further comprising determining that the responsiveness indicator for the particular grid controller indicates degradation in response to determining that:
    the keepalive status of the particular grid controller is up; and
    the connectivity ranking of the particular grid controller is lower than the connectivity ranking of a predetermined number of other individual grid controllers.

19. The method of claim 17, further comprising determining that the responsiveness indicator for the particular grid controller indicates degradation, in response to determining that:
    the keepalive status of the particular grid controller is up; and
    the pending transaction ranking of the particular grid controller is higher than the pending transaction ranking of a predetermined number of other individual grid controllers.

20. A system comprising:
    a grid array comprising one or more individual grid controllers, one of which is a managing grid controller comprising one or more processors configured to execute code to cause the one or more processors to:
        collect a status update for the individual grid controllers in the grid array, the status update comprising a keepalive status and at least one of a connectivity indicator between pairs of the individual grid controllers and a pending transaction indicator between pairs of the individual grid controllers;
        determine a responsiveness indicator of a particular grid controller of the individual grid controllers based on the keepalive status, and at least one of an aggregate connectivity indicator and an aggregate pending transaction indicator, for the particular grid controller; and
        remove the particular grid controller from use in the grid array in response to determining that the responsiveness indicator of the particular grid controller indicates that the particular grid controller is degraded.

* * * * *